US009965042B2

(12) United States Patent
Jules et al.

(10) Patent No.: US 9,965,042 B2
(45) Date of Patent: May 8, 2018

(54) METHODS AND SYSTEMS FOR GESTURE BASED SWITCH FOR MACHINE CONTROL

(71) Applicant: X Development LLC, Mountain View, CA (US)

(72) Inventors: Anthony Sean Jules, Oakland, CA (US); Aaron Edsinger, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 0 days. days.

(21) Appl. No.: 14/672,750

(22) Filed: Mar. 30, 2015

(65) Prior Publication Data

US 2016/0291697 A1   Oct. 6, 2016

(51) Int. Cl.
*G06F 3/01* (2006.01)
*G06F 21/31* (2013.01)
(Continued)

(52) U.S. Cl.
CPC .............. *G06F 3/017* (2013.01); *G06F 3/041* (2013.01); *G06F 3/04883* (2013.01);
(Continued)

(58) Field of Classification Search
CPC .............. G06F 3/0488; G06F 3/04886; G06F 3/04842; G06F 3/04845; G06F 3/04847; G06F 3/0484
See application file for complete search history.

(56) References Cited

U.S. PATENT DOCUMENTS 4,991,227 A * 2/1991 Kehler, Jr. ............... H04B 1/10
455/220
6,560,513 B2   5/2003 Krause
(Continued)

FOREIGN PATENT DOCUMENTS

| EP | 2811420 | 9/2014 |
| WO | WO 2013/166261 | 11/2013 |
| WO | WO 2014/127822 | 8/2014 |

OTHER PUBLICATIONS

International Search Report and Written Opinion prepared by the European Patent Office in International Application Serial No. PCT/US2016/016049, dated May 2, 2016.
(Continued)

*Primary Examiner* — Patrick F Marinelli
(74) *Attorney, Agent, or Firm* — McDonnell Boehnen Hulbert & Berghoff LLP

(57) ABSTRACT

Examples described may relate to methods and systems for gesture based switch for machine control. Some machines may be operated by computing devices that include touchscreens, and a graphical user interface (GUI) is provided for enabling control of the machines. Within examples, a disconnect switch can be incorporated into the GUI. As one example, to initiate operation of a machine, such as a robotic device, a user may be required to contact the touchscreen at a location and then trace out a pattern. To enable continued operation of the machine, the GUI may require the user to maintain contact with the touchscreen at a "goal" position. If contact with the touchscreen is broken (e.g., for more than a threshold amount of time), the machine operation may be halted, and the process to initiate operation can be performed again on the touchscreen to cause the machine to resume operation.

19 Claims, 5 Drawing Sheets

(51) Int. Cl.
*G06F 3/0488* (2013.01)
*G06F 3/041* (2006.01)

(52) U.S. Cl.
CPC .......... *G06F 3/04886* (2013.01); *G06F 21/31* (2013.01); *G06F 2221/2133* (2013.01)

(56) References Cited

U.S. PATENT DOCUMENTS

| | | | |
|---|---|---|---|
| 7,643,907 B2 | 1/2010 | Fuhlbrigge | |
| 8,577,517 B2 | 11/2013 | Phillips | |
| 8,621,062 B1* | 12/2013 | Anderson | G06F 11/30 709/223 |
| 9,015,827 B2* | 4/2015 | Rohrweck | G06F 21/36 455/418 |
| 9,262,073 B2* | 2/2016 | Howard | G06F 3/04815 |
| 2002/0114272 A1* | 8/2002 | Stewart | H04L 41/0681 370/218 |
| 2004/0056759 A1* | 3/2004 | Ungs | G08B 13/1409 340/5.74 |
| 2005/0105471 A1* | 5/2005 | Ido | H04L 29/06027 370/241 |
| 2006/0132432 A1* | 6/2006 | Bell | G06F 3/011 345/156 |
| 2006/0233548 A1* | 10/2006 | Shivnan | H04B 10/1149 398/33 |
| 2007/0150842 A1* | 6/2007 | Chaudhri | G06F 3/04883 715/863 |
| 2007/0214423 A1* | 9/2007 | Teplov | G06F 3/1454 715/751 |
| 2008/0019539 A1* | 1/2008 | Patel | H04R 3/00 381/96 |
| 2008/0168290 A1* | 7/2008 | Jobs | G06F 1/26 713/324 |
| 2008/0252487 A1* | 10/2008 | McClellan | G01S 5/0027 340/936 |
| 2010/0087228 A1* | 4/2010 | Griffin | G06F 3/0485 455/566 |
| 2011/0260829 A1* | 10/2011 | Lee | G06F 3/0414 340/5.51 |
| 2011/0285636 A1* | 11/2011 | Howard | G06F 3/04815 345/173 |
| 2012/0046079 A1* | 2/2012 | Kim | H04M 1/72577 455/566 |
| 2013/0093707 A1* | 4/2013 | Park | G06F 21/31 345/173 |
| 2013/0112202 A1* | 5/2013 | Fogelbrink | A61M 16/00 128/204.21 |
| 2013/0179681 A1 | 7/2013 | Benson et al. | |
| 2013/0227450 A1* | 8/2013 | Na | G06F 3/048 715/764 |
| 2014/0033108 A1* | 1/2014 | Paccagnan | G05B 19/409 715/771 |
| 2014/0033130 A1* | 1/2014 | Paccagnan | G05B 19/409 715/835 |
| 2014/0157403 A1* | 6/2014 | Rohrweck | G06F 21/36 726/19 |
| 2014/0192634 A1* | 7/2014 | Vadivelu | H04L 12/5692 370/221 |
| 2014/0333525 A1* | 11/2014 | Gromes, Sr. | G06F 3/01 345/156 |
| 2014/0336793 A1* | 11/2014 | Gromes, Sr. | G06F 3/01 700/81 |
| 2014/0336827 A1* | 11/2014 | Gromes, Sr. | G06F 3/01 700/282 |
| 2014/0336828 A1* | 11/2014 | Gromes, Sr. | G06F 3/01 700/282 |
| 2015/0055161 A1* | 2/2015 | Allison | G06F 21/608 358/1.13 |
| 2015/0089454 A1* | 3/2015 | Wu | G06F 3/0485 715/863 |
| 2015/0288682 A1* | 10/2015 | Bisroev | G06F 3/0481 713/172 |
| 2015/0358455 A1* | 12/2015 | Mosher | H04W 4/22 455/404.1 |
| 2016/0006778 A1* | 1/2016 | Beckhardt | H04N 21/42684 370/328 |
| 2016/0092529 A1* | 3/2016 | Lu | G06F 3/0486 715/771 |
| 2016/0129552 A1* | 5/2016 | Gromes, Sr. | G06F 3/01 700/283 |
| 2016/0170494 A1* | 6/2016 | Bonnet | G06F 3/017 345/173 |
| 2016/0220902 A1* | 8/2016 | Howard | A63F 13/42 463/31 |
| 2016/0291697 A1* | 10/2016 | Jules | G06F 3/017 |

OTHER PUBLICATIONS

Silverlit Toys Manufactory Limited, "Touch Sensor Remote Control", retrieved from http://silverlit.com/brand/150-licensed-vehicle, 2014.

* cited by examiner

METHODS AND SYSTEMS FOR GESTURE BASED SWITCH FOR MACHINE CONTROL

BACKGROUND

Unless otherwise indicated herein, the materials described in this section are not prior art to the claims in this application and are not admitted to be prior art by inclusion in this section.

Robotic systems may be used for various applications, including material handling, welding, assembly, and manufacturing, among others. The increase reliance on robotic systems to complete tasks has led to further developments of robotic devices becoming more efficient and reliable. Different types of robotic devices have been developed, including bipedal, quadruped, and gripping-manufacturing configurations. As different types are developed, a demand for efficient robotic systems has helped open up a field of innovation in robotic system development.

SUMMARY

Example embodiments may relate to methods and systems for gesture based switch for machine control. An example method comprises receiving an input gesture on a touchscreen of a computing device, and the input gesture includes contact on the touchscreen at a first location, followed by movement along a pattern on the touchscreen to a second location on the touchscreen. The example method also includes enabling control of operation of a machine by the computing device based on the input gesture being authenticated and on persistent contact at the second location on the touchscreen being detected, and based on lack of detection of the persistent contact at the second location on the touchscreen, disabling control of operation of the machine by the computing device.

In other examples, a non-transitory computer readable medium having stored thereon instructions that, upon execution by a computing device, cause the computing device to perform functions is described. The functions comprise receiving an input gesture on a touchscreen of the computing device, and the input gesture includes contact on the touchscreen at a first location, followed by movement along a pattern on the touchscreen to a second location on the touchscreen. The functions also comprise enabling control of operation of a machine based on the input gesture being authenticated and on persistent contact at the second location on the touchscreen being detected, and based on lack of detection of the persistent contact at the second location on the touchscreen, disabling control of operation of the machine.

In still other examples, a system that comprises a touchscreen, one or more processors, and data storage including instructions executable by the one or more processors to cause the system to perform functions. The functions comprise receiving an input gesture on the touchscreen, and the input gesture includes contact on the touchscreen at a first location, followed by movement along a pattern on the touchscreen to a second location on the touchscreen. The functions also comprise enabling control of operation of a machine based on the input gesture being authenticated and on persistent contact at the second location on the touchscreen being detected, and based on lack of detection of the persistent contact at the second location on the touchscreen, disabling control of operation of the machine.

These as well as other aspects, advantages, and alternatives will become apparent to those of ordinary skill in the art by reading the following detailed description, with reference where appropriate to the accompanying drawings.

DETAILED DESCRIPTION

Figure 1:
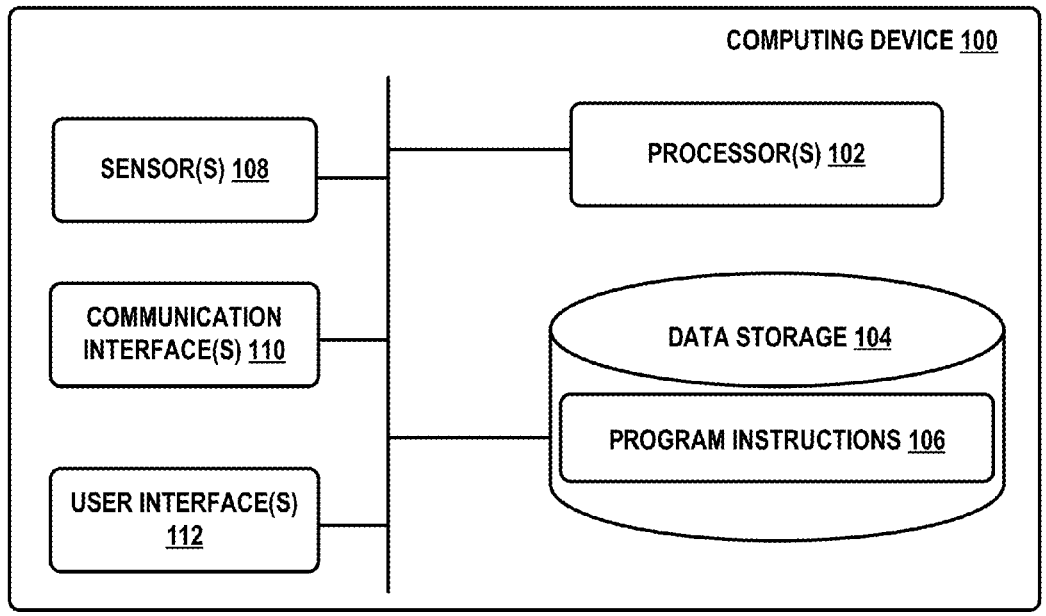
FIG. 1 is a block diagram of an example computing device.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

A mechanical disconnect switch for a machine (sometimes referred to as a deadman's switch) is a switch that may be programmed to automatically operate if an operator manually disengages the switch. These switches can be used as a form of fail-safe where the switch will stop a machine from operating if disengaged. Example disconnect switches may be used in locomotives, freight elevators, treadmills, etc. On some machines, such switches return machine operation to a known safe state, such as reducing a throttle to idle or applying brakes while leaving the machine still running and ready to resume operation once control is reestablished.

Some machines may be operated by computing devices that include touchscreens, and a graphical user interface (GUI) is provided for enabling control of the machines. Within examples described herein, a disconnect switch can be incorporated into the GUI. As one example, to initiate operation of a machine, such as a robotic device, a user may be required to contact the touchscreen at a specified location and then trace out a "maze" or other pattern by following a specific path. To enable continued operation of the machine, the GUI may require the user to maintain contact with the touchscreen at a "goal" position of the maze. If contact with the touchscreen is broken (for more than a threshold amount of time), the machine operation may be halted, and the process to initiate operation can be performed again on the touchscreen to cause the machine to resume operation (and regain control of the machine).

As a specific example, a robotic device may be controlled using a touch-based tablet device, and to activate the robotic device, a user may be required to contact the touchscreen and follow a maze and complete the maze at a button on the screen. As long as the user contacts the touchscreen at the button location, the robotic device remains activated. If a loss of contact with the touchscreen occurs, the robotic device halts operation. To reactivate the robotic device, the user performs the maze again to return to the button location. Thus, active motion or movements on the touchscreen are required to initiate and maintain operation of the robotic device. Operation of the robotic device may be halted quickly, and requires user action to restart.

Use of the maze or specific pattern to initiate operation can be helpful to prevent accidental or unintended operation of the robotic device. The computing device may require such a multi-touch gesture (e.g., pattern followed by persistent contact) to initiate and maintain operation. Other gestures may be used, or other inputs can be required such as requiring an input password followed by persistent contact on the screen. At any time if contact on the screen is not detected following initiation of the robotic device, the control of the machine is disabled. Such operation may require a user to have one hand or finger that exists to provide persistent contact, and the other hand or fingers used for other gestures to control specific actions of the machine.

In any of the examples, during operation, if contact is removed from the goal or switch location, a display on the computing device may return to a locked state, a message may be displayed indicating operation is halted, and/or the computing device may provide other alerts, such as a vibration or audio alert to indicate operation of robotic device has paused.

Referring now to the Figures, FIG. 1 is a block diagram of an example computing device 100. Representing one of many possible example configurations of computing devices, the block diagram of the computing device 100 illustrates an example computing device configured to perform at least the operations described herein. As such, the computing device 100 may exist in various forms including, but not limited to, a mobile phone, wearable computing device, motion control device, or tablet computer. Furthermore, the computing device 100 may also be referred to herein as a computer, phone, wearable computing device, device, or tablet, etc.

As shown in FIG. 1, the computing device 100 includes processor(s) 102, data storage 104, program instructions 106, sensor(s) 108, communication interface(s) 110, and user interface(s) 112. The computing device 100 is shown for illustration purposes having the components listed above, but may include more or less components than shown in FIG. 1 in other examples. In addition, the various components of the computing device 100 may be connected in any manner, including wired or wireless connections, etc. Furthermore, in some examples, components of the computing device 100 may be positioned on multiple entities rather than on a single entity. Other configurations of the computing device 100 may exist.

As indicated, the computing device 100 may include processor(s) 102. The processor(s) 102 may operate as general-purpose processor(s) or a special purpose processor(s) (e.g., digital signal processors, application specific integrated circuits, etc.). Furthermore, any number of processors may be present, and the processor(s) 102 can be configured to execute the computer-readable program instructions 106 that are stored in the data storage 104. The computing device 100 may include one or more processors within examples.

The data storage 104 may exist as any one or more various types of storage configured to hold memory. For example, the data storage 104 may include or take the form of one or more non-transitory computer-readable storage media that can be read or accessed by the processor(s) 102. The one or more computer-readable storage media can include volatile and/or non-volatile storage components, such as optical, magnetic, organic or other memory or disc storage, which can be integrated in whole or in part with the processor(s) 102. In some implementations, the data storage 104 may be a single physical device (e.g., one optical, magnetic, organic or other memory or disc storage unit). In other example implementations, the data storage 104 can be implemented using two or more physical devices, which may communicate via wired or wireless communication. Further, in addition to the non-transitory computer-readable program instructions 106, the data storage 104 may include additional data such as diagnostic data, among other possibilities.

The computing device 100 may include various sensor(s) 108, such as force sensor(s), proximity sensor(s), motion sensor(s), position sensor(s), and touch sensor(s), among other possibilities. The sensor(s) 108 may be configured to measure motion, orientation, and various environmental conditions. As such, the different types of sensors may be configured to provide raw data with high precision and accuracy to the processor(s) 102 and/or other components of the computing device 100. Furthermore, the sensor(s) 108 may be configured to capture and provide information to one or more users.

The sensor(s) 108 may include a touchscreen display capable of receiving instructions through detection of contact on the display. The touchscreen display may be a display that receives touch or multi-touch gestures through contact with the screen with a stylus/pen and/or one or more fingers. The touchscreen may detect contact through resistive, surface acoustic wave (SAW), or capacitive sensing techniques.

The communication interface(s) 110 may include one or more components configured to enable communication with other devices. In particular, communication interface(s) 110 may enable communication with mobile phones, computing devices, servers, control systems, and/or robotic devices, among other possibilities. The communication interface(s) 110 may include respective components configured to send/receive data between devices and may further maintain and mange records of data sent/received. The communication interface(s) 110 may also enable the computing device 100 to establish wired (e.g., USB connections) or wireless connections. The wireless connections may involve using one or more of various technologies, such as Bluetooth® radio technology, communication protocols described in IEEE 802.11 (including any IEEE 802.11 revisions), or Cellular technology (such as GSM, CDMA, UMTS, EV-DO, WiMAX, or LTE), among other possibilities.

In addition, communication interface(s) 110 may include near field communication (NFC) technology. NFC is a set of short-range wireless technologies, which may operate based on a threshold distance (e.g., 2 to 3 feet) to initiate a connection. NFC technology may enable the computing device 100 to initiate and establish communications with other devices, servers, control systems, robotic devices, and/or other entities having NFC capability. NFC may allow the computing device 100 to share small payloads of data with other computing devices. Furthermore, the computing device 100 may interact with other devices via a "cloud" network, which enables computing devices to communicate wirelessly.

The computing device 100 may include user interface(s) 112 configured to enable a user to operate the computing device 100. Among possible examples, the user interface(s) 112 may include any type of graphical user interface (GUI), buttons, a touchscreen interface, a microphone, camera, motion sensors, and/or any other elements for receiving inputs. In some examples, the computing device 100 may include a speech recognition module that include voice user interface(s), such as search, call routing, voice dialing, simple data entry, document preparation, and/or speech-to-text processing, for example. Additionally, the computing device 100 may also include various components for providing outputs to a user and/or other devices, such as speakers, graphical interfaces, etc.

Figure 2:
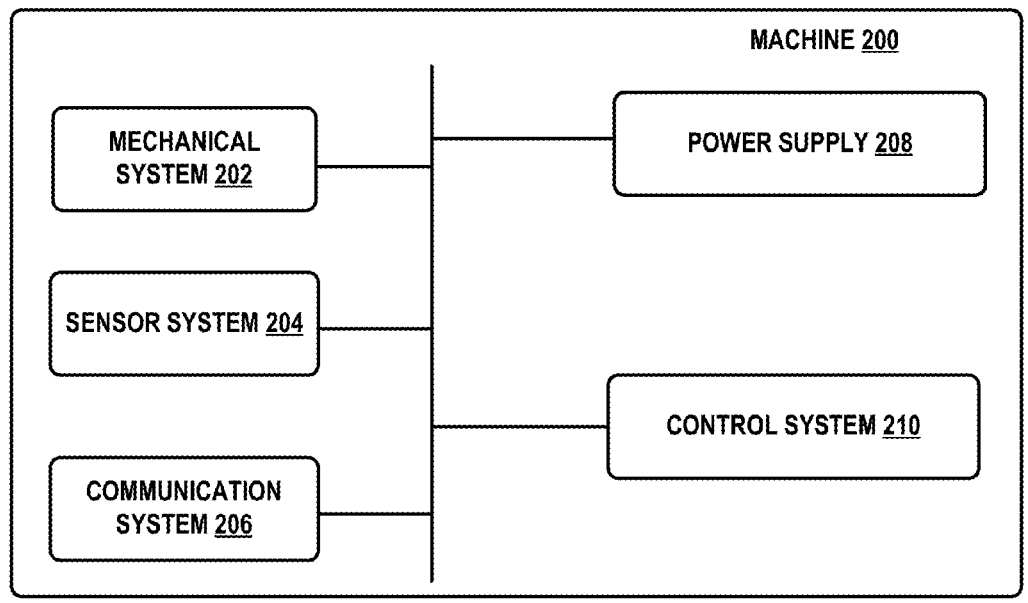
FIG. 2 is a simplified block diagram of an example machine.

FIG. 2 is a simplified block diagram of an example machine 200. In particular, the block diagram of machine 200 may represent an example robotic system configured to perform at least the operations described herein. In some examples, machine 200 may be configured to operate autonomously, semi-autonomously, and/or by enabling control by user(s) through various interfaces. The computing device of FIG. 1 may be used to control operation of the machine 200. Additionally, the machine 200 may exist in various physical forms including, but not limited to, a manipulating arm configuration, humanoid robot, or quadruped robot configuration, among other possible example configurations. Moreover, the machine 200 may also be referred herein as other possible labels, such as a robotic device, mobile robot, or robot, etc.

As illustrated in FIG. 2, the machine 200 may be configured to include various subsystems, such as a mechanical system 202, a sensor system 204, a communication system 206, a power supply system 208, and a control system 210. In other examples, the machine 200 may include more or fewer subsystems, and each subsystem could include multiple components. Furthermore, the subsystems and the components within the subsystems may be interconnected via various types of connections, including wireless and/or wired connections.

The mechanical system 202 may include various components that enable the machine 200 to perform operations, including, but not limited to a body, legs, arms, joints, grippers, wheels, a base, manipulators, etc. The various mechanical and/or electrical components may be interconnected to enable the machine 200 to perform operations relating to various tasks. For example, a gripper may connect to an arm that connects to the base of the machine 200 using various types of joints and links to enable operation in varying degrees of freedom. In addition, the mechanical system 202 may include one or more motors to enable the components of the mechanical system 202 to perform the operations. Different components may be interconnected using joints and/or other types of connections that permit desired degrees of freedom.

The sensor system 204 may include one or more sensors configured to detect information about the environment and operations of components of the mechanical system 202 of the machine 200. One or more sensors may be connected to various components of the mechanical system 202. The sensor system 204 may use one or more body-mounted sensors, including two-dimensional (2D) sensor(s) and/or three-dimensional (3D) depth sensors to obtain information about the surrounding environment of the machine 200. Sensors may couple to other components of the mechanical system 202, such as to grippers to measure parameters associated with grip operations. Sensors may assist the machine 200 carry out tasks, including providing alerts relating to proximity of components relative to objects or contact sensors.

The sensor system 204 may include an inertial measurement unit (IMU), which may include an accelerometer and/or gyroscope, among other possible sensors. The IMU may be configured to determine an orientation, position, velocity, and/or acceleration of the machine 200. Furthermore, the sensor system 204 may include other types of sensors, such magnetometers and pressure sensors, among possibilities.

The communication system 206 may include one or more components that enable the machine 200 to communicate with other devices. The communication system 206 may include different types of communication interfaces, including wireless communication technologies, such as NFC technology. As such, the communication system 206 may allow the machine 200 to communicate with other devices, servers, including enabling the ability for the communication system 206 to send and receive information. In some examples, the communication system 206 may include technology that enables the control system(s) of the machine 200 to communicate with other devices across a "cloud" network. Other components may exist within the communication system 206.

The power supply 208 may include various types of power sources configured to provide power to components of the machine 200. The power supply 208 may include electric sources, such as a rechargeable lithium-ion or lead-acid battery, for example. The power supply 208 may include a hydraulic system, a pneumatic system, solar power, and/or banks of batteries, for example. Other power supply materials and types are also possible. Additionally, in some examples, the power supply 208 may include components that enable the machine 200 to provide power to external devices, such as the computing device 100, for example.

The control system 210 may be one or more components configured to control operations of the machine 200. As such, the control system 210 may include one or more computing devices configured to control different operations of the machine 200. The one or more computing devices within the control system 210 may include one or more processors, data storage, and instructions (e.g., program logic), among other possible computational components. Additionally, the one or more processors may include one or more microprocessors.

As indicated, the control system 210 may include various types of memory, which may include instructions executable by the one or more processors to execute various functions of the machine 200, including functions described herein. The memory may include additional instructions, including instructions to transmit/receive data, interact with, and/or control one or more of the mechanical system 202, the sensor system 204, the communication system 206, and the power supply 208.

In some instances, the control system 210 may receive information from the sensor system 204 to determine operations for controlling components of the mechanical system 202. The control system 210 may be located on and/or in the machine 200 or may be physically separate from the machine 200. The control system 210 may utilize one or more components of the communication system 206 to control operations of the machine 200. As such, the control system 210 may control the machine 200 through wired or wireless communication.

The control system 210 may be configured to communicate with other devices through the communication system 206, including through NFC technology. For example, the control system 210 may engage in signaling and/or other forms of communication with the computing device 100 through various wired and/or wireless technologies, such as NFC.

Figure 3:
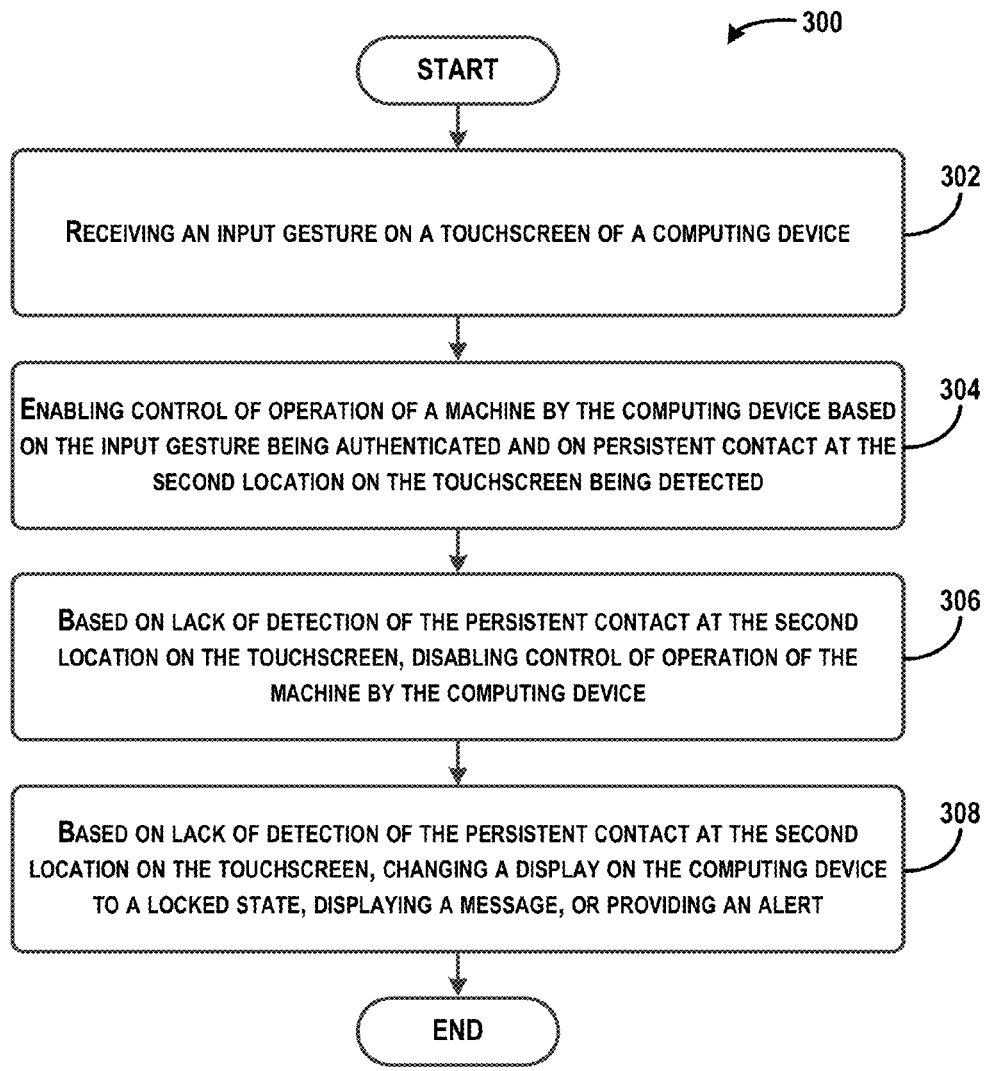
FIG. 3 is a block diagram of an example method for gesture based switch for machine control, in accordance with at least some embodiments described herein.

FIG. 3 is a block diagram of an example method for gesture based switch for machine control, in accordance with at least some embodiments described herein. Method 300 may include one or more operations, functions, or actions as illustrated by one or more of blocks 302-308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

Illustrative methods, such as method 300, may be carried out in whole or in part by a component or components in a computing device, the cloud, and/or a robotic system, such as by the one or more of the components of the computing device 100 shown in FIG. 1, or by the one or more of the components of the machine shown in FIG. 2. However, it should be understood that example methods, such as method 300, may be carried out by other entities or combinations of entities (i.e., by other computing devices and/or combinations of computing devices).

For example, functions of the method 300 may be fully performed by a computing device (or components of a computing device such as one or more processors), or may be distributed across multiple components of the computing device, across multiple computing devices, and/or across a server. In some examples, the computing device may receive information from sensors of the computing device, or where the computing device is a server the information can be received from another device that collects the information. As other examples, the method 300 may be performed by a computing device, by a server, or by a robotic device.

At block 302, the method 300 includes receiving an input gesture on a touchscreen of a computing device. The computing device may be capable of controlling a machine, a robotic device, or any other devices, and the input gesture may be a first process for authentication to enable the control.

The input gesture may include contact on the touchscreen at a first location, followed by movement along a pattern on the touchscreen to a second location on the touchscreen. The movement along the pattern on the touchscreen includes constant contact on the touchscreen along the pattern. The input gesture may also include input of a passcode on the touchscreen using swipe motions, followed by movement along the pattern on the touchscreen to a second location.

Figure 4A:
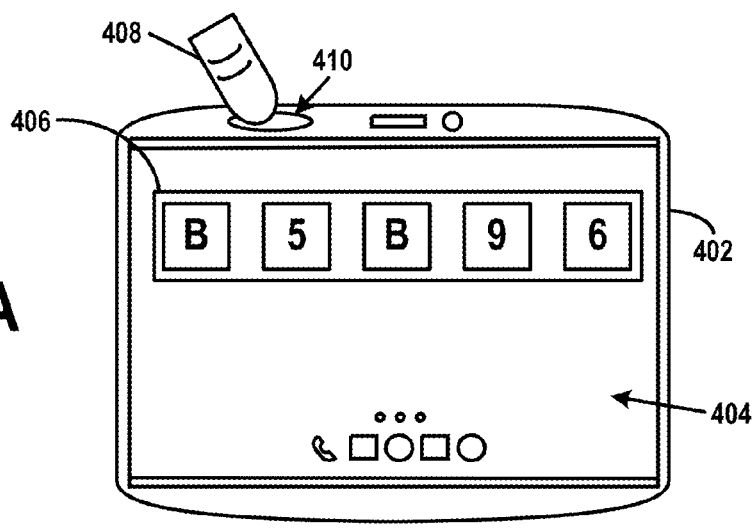
FIGS. 4A-4C illustrate an example computing device and example input gestures.
Figure 4B:
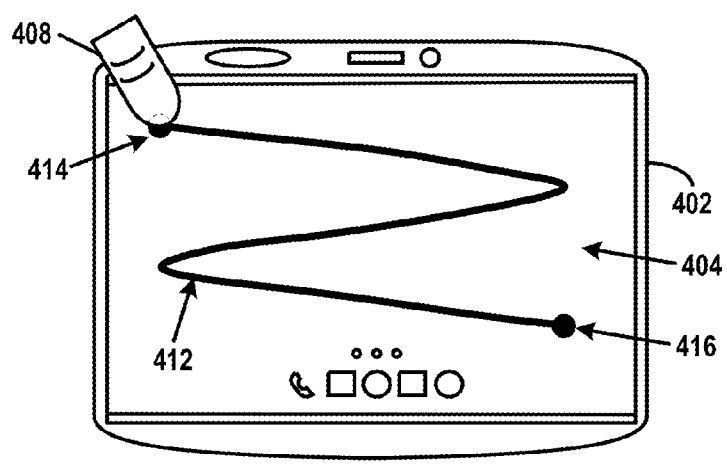
Figure 4C:
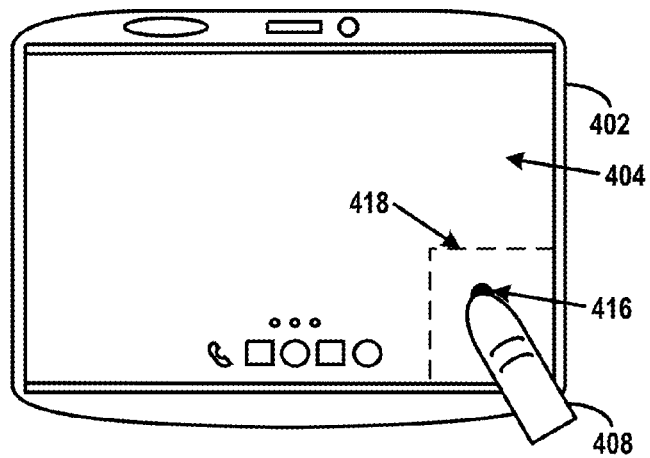

FIGS. 4A-4C illustrate an example computing device and example input gestures. In FIG. 4A, a computing device 402 is shown that has a touchscreen 404. A user may enter a passcode 406 on the touchscreen to unlock or authenticate the device, such as an alphanumeric passcode. In other examples, a user 408 may unlock or authenticate the device by providing a biometric input at a biometric sensor 410.

As previously indicated, an example computing device, such as the computing device 402, may be configured to detect and/or receive various types of input or contact gestures from a user. The different types of gestures may include input of passcodes, such as the alphanumeric passcode 406 shown on the graphical display of the computing device 402 in FIG. 4A, and/or biometric inputs, such as the fingerprint input (i.e., biometric input 408). Other types of gestures may be detected and/or received by example computing devices configured to engage in wireless control of one or more robotic devices. Passcode inputs may be performed using swipe motions across an alphanumeric keyboard display, for example.

For example, FIG. 4B illustrates another example input gesture, which may include any pattern on the touchscreen. An example pattern 412 is shown as motions in a zig-zag across the screen 404. Any pattern may be used or correlated as tied to the input gesture including any motion following a shape (circular pattern), or a customized motion as well (e.g., input of a name using cursive signature). Thus, the user may contact the touchscreen 404 at a first location 414, followed by movement along the pattern 412 on the touchscreen 404 to a second location 416. The movement along the pattern 412 on the touchscreen includes constant contact on the touchscreen 404 along the pattern 412 without a user lifting up the finger, for example. Some example patterns may allow for non-constant contact along the pattern 412 as well, such as a multi-touch pattern to tap the touchscreen 404 a number of times.

The input gesture can require some active motion by a user that is not likely to be accidental, so as to determine an intent to initiate control of the machine, for example.

The input gesture may be interpreted and authenticated to provide a variety of information or control of a machine. For example, a computing device may interpret the input gesture as a signal to start a process relating to obtaining control of a robotic device. Similarly, the input gesture may confirm to a computing device that a user is allowed to receive control of a robotic device. Additionally, in some instances, the input gesture may represent a desire by the user to return some amount of control to a control system of a robotic device and/or signal to the computing device to return the control. In other examples, the gestures may represent other information for a computing device to use and process as well.

Referring back to FIG. 3, at block 304, the method 300 includes enabling control of operation of a machine by the computing device based on the input gesture being authenticated and on persistent contact at the second location on the touchscreen being detected. Thus, within examples, the method 300 includes authenticating the input gesture by comparing the received contact on the touchscreen to a stored gesture, and authenticating the input gesture when the received contact substantially matches the stored gesture. Substantially matching may include not exactly matching, and allowing for deviations or variations, including for example, tolerances, measurement error, measurement accuracy limitations and other factors known to skill in the art, to occur in amounts that do not preclude the effect or approximately the input gesture. Thus, some deviations may allow for the input gesture to be within, for example, about 0.1 cm to about 0.5 cm of an expected area on the touchscreen. Other deviations may be smaller or larger depending on details of the input gesture.

Once the input gesture is authenticated, the method 300 includes determining whether there is persistent contact at the second location on the touchscreen by detecting the contact and monitoring whether the contact exists on a continuous basis. Persistent contact may include contact on the touchscreen that exists continuously or without interruption, for example. A persistent contact may also allow for substantially continuous contact, or continual contact, such that some deviation or variation in contact is allowed, such as an interruption that is less than a threshold amount of time, such as less than about 1-2 seconds, for example (e.g., if a finger slips or slides off the second location for less than about 1-2 seconds).

Once persistent contact is detected, e.g., contact at the second location is detected and no interruptions (or substantially no interruptions are detected), then control of operation of the machine may be enabled at the computing device. Control may be enabled once contact is first detected at the second location giving rise to persistent contact following authentication of the input gesture.

In some examples, to enable control of operation, the computing device may communicate with the machine to exchange credentials for linking to the machine, such as exchanging wireless communication information, private encrypted keys, or other linking information.

In further examples, enabling control of operation of the machine by the computing device includes the computing device authenticating the input gesture, detecting contact at the second location on the touchscreen, determining that the contact is persistent (e.g., more than about 1 second), and then communicating with the machine to exchange credentials for linking the computing device to the machine.

Enabling control of operation of the machine may include activating a switch on the machine, powering up the machine, activating/unlocking an application on the computing device that is programmed to control operation of the machine, etc.

The computing device may display on the touchscreen the pattern to inform a user of an expected input gesture, and then based on authentication of the input gesture, the computing device may display on the touchscreen an icon informing of the second location being a deadman switch contact area.

FIG. 4C illustrates an example second location area on the touchscreen 404. For example, the second location 416 may be detected at any place inside a second location area 418. The second location area 418 may be displayed on the touchscreen 404 using a dotted box to inform a user of boundaries for input of contact that qualifies as persistent contact at the second location.

Referring back to FIG. 3, at block 306, the method 300 includes based on lack of detection of the persistent contact at the second location on the touchscreen, disabling control of operation of the machine by the computing device. Thus, if persistent contact at the second location is not detected, then control is disabled. As mentioned, persistent contact may allow for some variation or deviation of detection for about 1-2 seconds, but when contact is not detected for more than any such variation (e.g., for more than a threshold amount of time), control is disabled.

The persistent contact is implemented to ensure that a human operator is present to monitor operations of the machine. In other examples, this may also be performed by the computing device and machine maintaining a "heartbeat", in which the computing device and machine exchange communication at regular intervals. If the interval for communication from the computing device exceeds a threshold (e.g., more than a few seconds), control of operation is disabled. The computing device may be programmed to exchange communication based on input received at the touchscreen device.

Disabling control of operation of the machine by the computing device may include disabling communications between the machine and the computing device. Further, based on lack of detection of the persistent contact at the second location on the touchscreen, the computing device may send instructions to the machine to perform a specific function, such as pausing operation of the machine, placing the machine into a safe configuration, turning off the machine, etc.

Disabling control of operation of the machine may also include deactivating a switch on the machine, powering down the machine, deactivating/locking an application on the computing device that is programmed to control operation of the machine, etc. In other examples, disabling control of operation may include executing a specific program subroutine (a Callback) by the application running on the computing device, which is registered as responsible for determining loss on contact at the second location.

At block 308, the method 300 includes based on lack of detection of the persistent contact at the second location, causing one or more actions to occur including changing a display on the computing device to a locked state, displaying a message indicating operation of the machine is paused, and providing at the computing device a vibration or audio alert to indicate operation of machine has paused. This may inform the user that control of the machine is halted, and user is required to re-authenticate the computing device to control the machine again.

Thus, within examples, to resume operation of the machine the computing device may receive a second input gesture on the touchscreen of the computing device, and resume operation of the machine based on the second input gesture being authenticated and on persistent contact at the second location being detected. The second gesture may be the same as the first gesture, or may be a different requested gesture as well.

Using the method 300, a simulated deadman switch for machine control is provided with a touchscreen device. A user places a finger at a specified location on the touchscreen and traces out a "maze" by following a specific path. The user then is required to leave their finger in a "goal" position of the maze (or pull the finger to the goal position without removing contact) to continue control of the machine, for example. If the finger contact is broken, the process is performed again before control of the machine is regained. This enables a quick way to stop machine control instead of using a traditional physical deadman switch with a mechanical button to be held to a certain position. With the touchscreen device, as long as contact is applied at the button location, the machine/robot remains activated. This requires a user to have one hand or one finger that exists as proxy as for a deadman switch, and the other hand or fingers may be used for other inputs on the touchscreen.

Thus, the method 300 enables functionality for a non-mechanical deadman switch on a touchscreen device.

Interpretation of the touchscreen inputs for persistent contact and enabling operation may be performed at an application level. As an example, an application on the computing device may be configured to determine that the unlock gesture has been input and that the persistent contact on the touchscreen is present at the predetermined location on the touchscreen to enable operation of the robotic device. The application also may be configured to distinguish touch inputs for control of the robotic device (that are received at other areas on the touchscreen) versus the persistent touch on the screen required to enable control of the robotic device. To do so, the application can receive all touch on the touchscreen, and subtract any touches detected at the "switch location" so as to utilize remaining touch inputs for control of the machine. Thus, the method 300 may include receiving multiple inputs on the touchscreen, distinguishing, from among the multiple inputs, some inputs from the persistent contact at the second location, and using the additional inputs to cause the machine to perform specific functions.

In other examples, interpretation of the touchscreen inputs for persistent contact and enabling control of operation may be performed at the operating system (OS) level on the computing device. As an example, following input of the unlock gesture or code, and persistent contact at the switch location, an OS of the computing device may then pass control to an application on the computing device for operation of the machine. The OS may monitor inputs at the switch location, and if contact is not detected, then the OS may disable all touch events to any area on the touchscreen, or may lock the screen and return to an initial state requiring input of the input gesture, for example. Thus, the method 300 may include an operating system of the computing device authenticating the input gesture and monitoring input at the second location for the persistent contact, the operating system providing control of the machine to an application on the computing device, and based on lack of detection of the persistent contact at the second location, the operating system disabling control of operation of the machine by the computing device by locking the touchscreen.

Figure 5A:
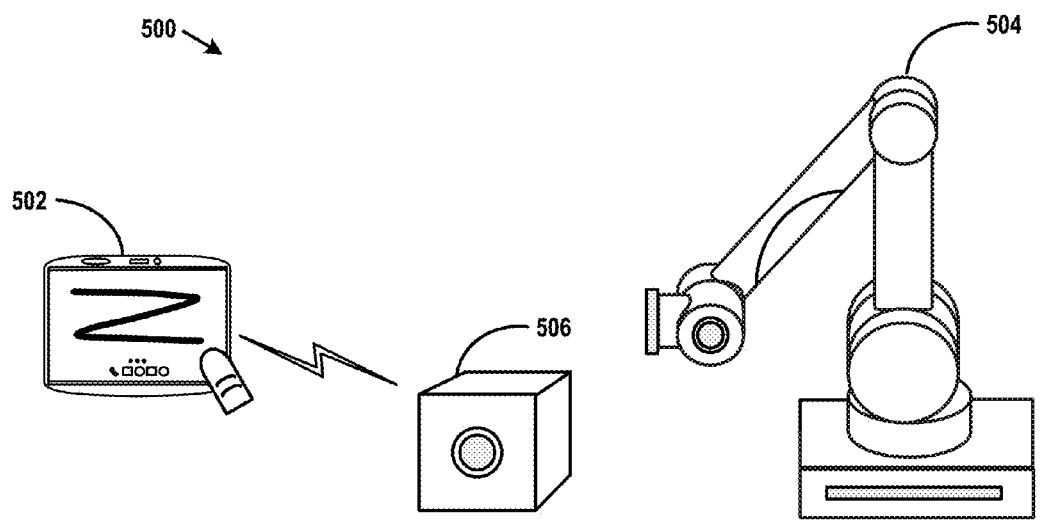
FIG. 5A shows an example scenario illustrating a computing device engaging in wireless control of a robotic device.

FIG. 5A shows an example scenario illustrating a computing device engaging in wireless control of a robotic device. The example scenario 500 includes a computing device 502 engaging and possibly assuming some amount of control of robotic device 504 by communication through a control system 506. A user using the computing device 502 to obtain control of the robotic device 504, such as within a manufacturing environment, may provide the input gesture and then hold contact on the computing device 502 to initiate control of the robotic device 504 by communication to the control system 506, which is configured to control one or more operations or other aspects of the robotic device 504. The control system 506 is shown separate from robotic device 504, but may be configured physically together with the robotic device 504 or may be in wireless or wired communication with the robotic device 504. Furthermore, in some instances, the control system 506 may merely represent one or more internal components of the robotic device 504. Example scenario 500 shows the computing device 502 communicating with the control system 506 via a wireless connection and possibly receiving some amount of control of the robotic device 504. In some instances, the computing device 502 may be communicating with the control system 506 via NFC technology, which may occur as a result of the computing device 502 detecting one or more gestures from a user.

Figure 5B:
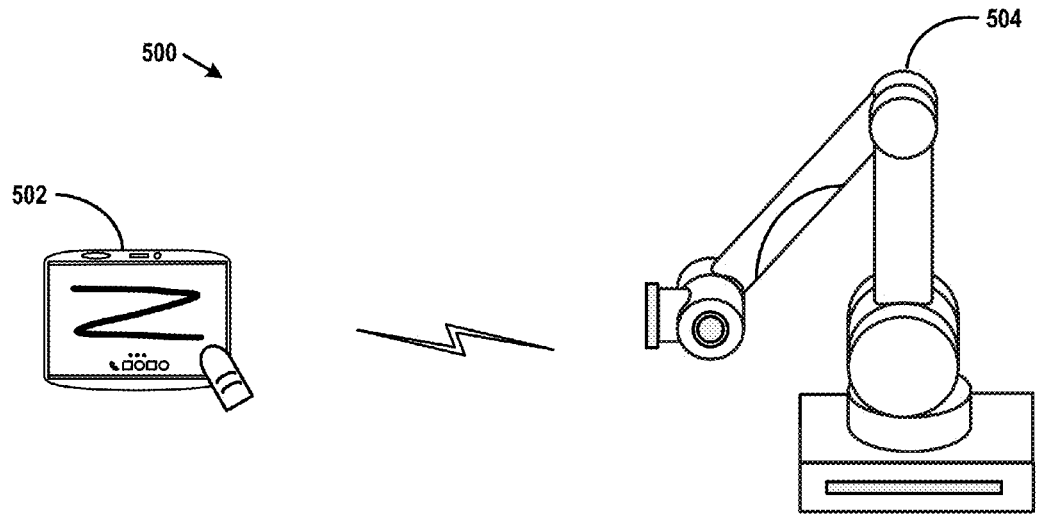
FIG. 5B shows an example scenario illustrating the computing device engaging in direct wireless control of the robotic device.

FIG. 5B shows an example scenario illustrating the computing device 502 engaging in direct wireless control of the robotic device 504, without any control system (or a control system may be included within the robotic device 504. In other examples, communications or connections between the computing device 502 and the robotic device 504 may also be a wired connection via USB, Ethernet, etc.

Figure 6:
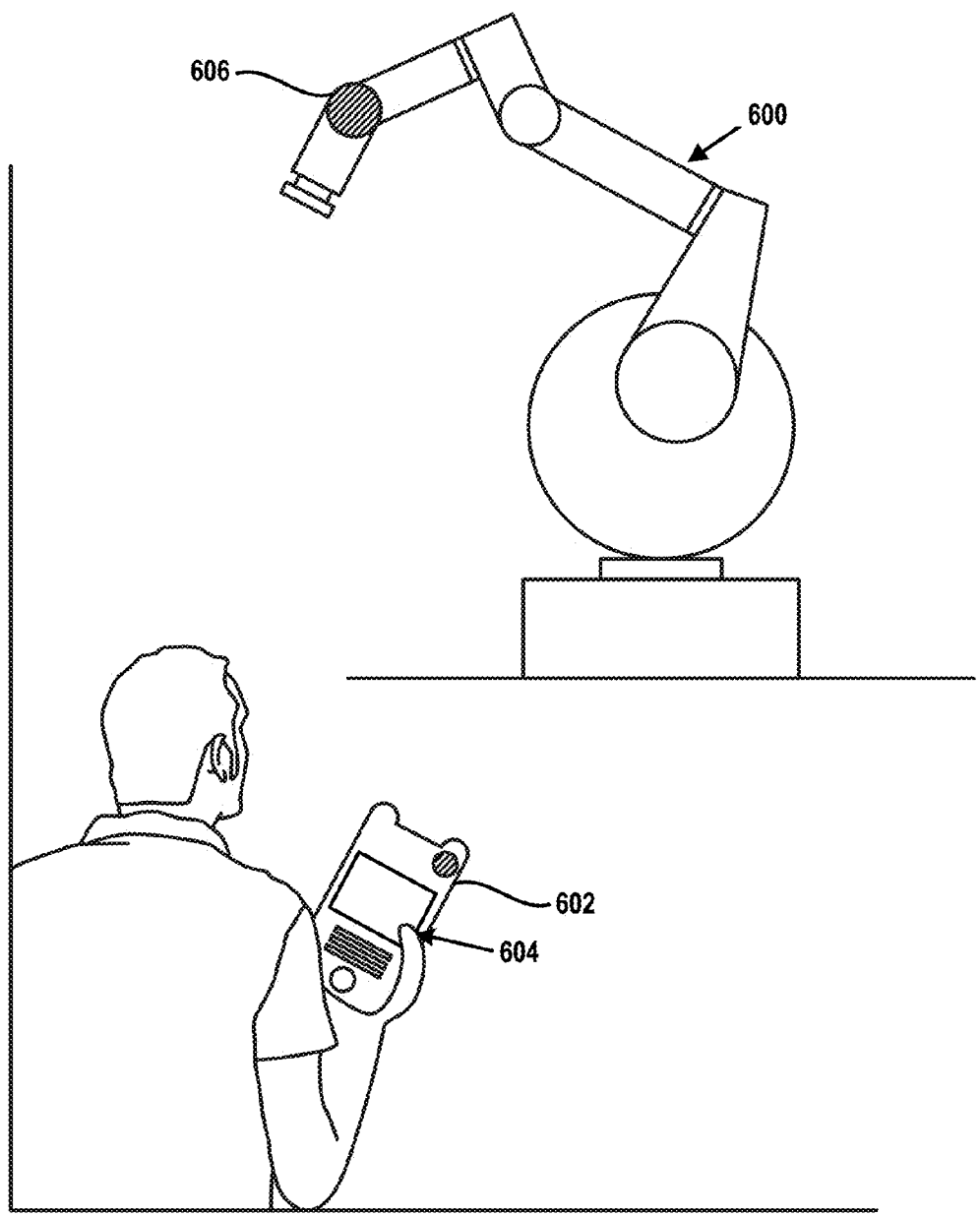
FIG. 6 illustrates another example robotic device being controlled by a computing device.

FIG. 6 illustrates another example robotic device 600 being controlled by a computing device 602. The computing device 602 may be handheld and used to control the robotic device 600. A user may enter an authorization, authentication, or other input gesture and then contact the computing device 602 on an area 604 of a touchscreen to enable control of the robotic device 600. The robotic device 600 may include an indicator 606 that is configured to provide visual feedback associated with communication to the computing device 602 as well.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. A method comprising:
displaying a pattern on a touchscreen of a computing device that includes a graphical user interface (GUI) for enabling control of an operation of a machine;
receiving an input gesture on the touchscreen of the computing device, the input gesture including movement along the pattern on the touchscreen from a first location of the pattern to a second location of the pattern; and
the GUI enabling the computing device to control the operation of the machine based on:
an authentication of the input gesture, and
detecting persistent contact within a defined location on the touchscreen, wherein the defined location includes the second location,
wherein the computing device is configured to display on the touchscreen, based on the authentication of the input gesture, boundaries for input of contact that qualifies as the persistent contact within the defined location,
wherein an operating system of the computing device is configured to:
interpret touch input for the persistent contact within the defined location,
enable the computing device to control the operation of the machine,
provide control of the operation of the machine to an application of the computing device in response to the authentication of the input gesture and detecting the persistent contact within the defined location, and
based on a lack of detection of the persistent contact within the defined location, disable control of the operation of the machine by the computing device by locking the touchscreen and returning the touchscreen to an initial state requiring the authentication of the input gesture, and
wherein the application of the computing device is configured to:
distinguish the touch input for the persistent contact within the defined location from other touch inputs representing contact outside of the defined location, and
using the other touch inputs for controlling the operation of the machine while detecting the touch input for persistent contact within the defined location.

2. The method of claim 1, wherein the input gesture includes input of a passcode on the touchscreen using swipe motions, followed by the movement along the pattern on the touchscreen.

3. The method of claim 1, further comprising:
determining that the input gesture concluded within the defined location on the touchscreen and continual contact within the defined location on the touchscreen is detected without interruption of contact.

4. The method of claim 1, further comprising:
based on the lack of detection of the persistent contact within the defined location of the touchscreen, pausing the operation of the machine.

5. The method of claim 1, further comprising:
determining that the touch input within the defined location corresponding to the persistent contact is lacking for more than a threshold amount of time; and
responsively pausing the operation of the machine.

6. The method of claim 5, further comprising, to resume the operation of the machine:
receiving a second input gesture on the touchscreen of the computing device; and
resuming the operation of the machine based on the second input gesture being authenticated and on persistent contact at the defined location being detected.

7. The method of claim 1, further comprising:
based on the lack of detection of the persistent contact within the defined location, causing one or more actions to occur including changing a display on the computing device to a locked state, displaying a message indicating the operation of the machine is paused, and providing at the computing device a vibration or audio alert to indicate the operation of machine has paused.

8. The method of claim 1, wherein the GUI enabling the computing device to control the operation of the machine is further based on the computing device and the machine exchanging communications at regular intervals to maintain a heartbeat.

9. The method of claim 1, wherein the other touch inputs are indicative of instructions for the machine to perform one or more actions.

10. A non-transitory computer readable medium having stored thereon instructions that, upon execution by a computing device, cause the computing device to perform functions comprising:
displaying a pattern on a touchscreen of a computing device that includes a graphical user interface (GUI) for enabling control of an operation of a machine;
receiving an input gesture on the touchscreen of the computing device, the input gesture including movement along the pattern on the touchscreen from a first location of the pattern to a second location of the pattern; and
the GUI enabling the computing device to control the operation of the machine based on:
an authentication of the input gesture, and
detecting persistent contact within a defined location on the touchscreen, wherein the defined location includes the second location,
wherein the computing device is configured to display on the touchscreen, based on the authentication of the input gesture, boundaries for input of contact that qualifies as the persistent contact within the defined location,
wherein an operating system of the computing device is configured to:
interpret touch input for the persistent contact within the defined location,
enable the computing device to control the operation of the machine,
provide control of the operation of the machine to an application of the computing device in response to the authentication of the input gesture and detecting the persistent contact within the defined location, and
based on a lack of detection of the persistent contact within the defined location, disable control of the operation of the machine by the computing device by locking the touchscreen and returning the touchscreen to an initial state requiring the authentication of the input gesture, and
wherein the application of the computing device is configured to:
distinguish the touch input for the persistent contact within the defined location from other touch inputs representing contact outside of the defined location, and using the other touch inputs for controlling the operation of the machine while detecting the touch input for persistent contact within the defined location.

11. The non-transitory computer readable medium of claim 10, wherein the functions further comprise:
based on the lack of detection of the persistent contact within the defined location on the touchscreen, sending instructions to the machine to perform a specific function.

12. The non-transitory computer readable medium of claim 10, wherein the functions further comprise:
determining that the touch input for the persistent contact is lacking for about 1-2 seconds; and
responsively pausing the operation of the machine.

13. The non-transitory computer readable medium of claim 10, wherein the GUI enabling the computing device to control the operation of the machine is further based on the computing device and the machine exchanging communications at regular intervals to maintain a heartbeat.

14. The non-transitory computer readable medium of claim 10, wherein the other touch inputs are indicative of instructions for the machine to perform one or more actions.

15. A system comprising:
a computing device including a touchscreen, an operating system, an application, and a graphical user interface (GUI) for enabling control of an operation of a machine;
one or more processors; and
data storage including instructions executable by the one or more processors to cause the system to perform functions comprising:
displaying a pattern on the touchscreen;
receiving an input gesture on the touchscreen of the computing device, the input gesture including movement along the pattern on the touchscreen from a first location of the pattern to a second location of the pattern; and
the GUI enabling the computing device to control of the operation of the machine based on:
an authentication of the input gesture, and
detecting persistent contact within a defined location on the touchscreen, wherein the defined location includes the second location,
wherein the computing device is configured to display on the touchscreen, based on the authentication of the input gesture, boundaries for input of contact that qualifies as the persistent contact within the defined location,
wherein the operating system of the computing device is configured to:
interpret touch input for the persistent contact within the defined location,
enable the computing device to control the operation of the machine,
provide control of the operation of the machine to the application in response to the authentication of the input gesture and detecting the persistent contact within the defined location, and
based on a lack of detection of the persistent contact within the defined location, disable control of the operation of the machine by the computing device by locking the touchscreen and returning the touchscreen to an initial state requiring the authentication of the input gesture, and
wherein the application of the computing device is configured to:
distinguish the touch input for the persistent contact within the defined location from other touch inputs representing contact outside of the defined location, and
using the other touch inputs for controlling the operation of the machine while detecting the touch input for persistent contact within the defined location.

16. The system of claim 15, wherein the functions further comprise, to resume the operation of the machine:
receiving a second input gesture on the touchscreen; and
resuming the operation of the machine based on the second input gesture being authenticated and on persistent contact at the defined location being detected.

17. The system of claim 15, wherein the functions further comprise:
based on the authentication of the input gesture, displaying on the touchscreen an icon informing of the defined location being a deadman switch contact area.

18. The system of claim 15, wherein the GUI enabling the computing device to control the operation of the machine is further based on the computing device and the machine exchanging communications at regular intervals to maintain a heartbeat.

19. The system of claim 15, wherein the other touch inputs are indicative of instructions for the machine to perform one or more actions.

* * * * *